(12) United States Patent
Simmons, II

(10) Patent No.: US 8,415,411 B2
(45) Date of Patent: Apr. 9, 2013

(54) FILLER COMPOSITION

(76) Inventor: John Paul Simmons, II, Farmington Hills, MI (US)

( * ) Notice: Subject to any disclaimer, the term of this patent is extended or adjusted under 35 U.S.C. 154(b) by 955 days.

(21) Appl. No.: 11/866,338

(22) Filed: Oct. 2, 2007

(65) Prior Publication Data

US 2009/0088487 A1      Apr. 2, 2009

(51) Int. Cl.
*C08J 9/00* (2006.01)
*C08J 9/32* (2006.01)
*B32B 3/26* (2006.01)

(52) U.S. Cl.
USPC ............ 523/218; 523/219; 521/82; 521/88; 521/91; 428/320.2; 428/322.7; 264/45.1

(58) Field of Classification Search ............... 523/219, 523/218; 525/531, 922; 428/320.2, 322.7; 264/45.1; 521/82, 88, 91
See application file for complete search history.

(56) References Cited

U.S. PATENT DOCUMENTS

| | | | |
|---|---|---|---|
| 4,374,178 A | | 2/1983 | Kulkarni et al. |
| 4,648,908 A | * | 3/1987 | Takasuka et al. ............. 106/417 |
| 5,371,117 A | * | 12/1994 | Parish et al. .................. 523/219 |
| 6,491,927 B1 | * | 12/2002 | Arnaud et al. ................ 424/401 |
| 2001/0043996 A1 | * | 11/2001 | Yamada et al. ............. 428/34.4 |
| 2007/0003745 A1 | * | 1/2007 | Edstrom et al. ............... 428/217 |
| 2007/0219318 A1 | * | 9/2007 | Lin et al. ......................... 525/94 |
| 2009/0053490 A1 | * | 2/2009 | Clausi et al. ................. 428/213 |

OTHER PUBLICATIONS

Liu et al. "A review of the various applications of gypsym fillers." Functional fillers and nanoscale Minerals. p. 261, 2003.*

* cited by examiner

*Primary Examiner* — Hannah Pak
(74) *Attorney, Agent, or Firm* — Dale F. Regelman; Quarles & Brady LLP

(57) ABSTRACT

A filler composition comprising one or more ester-containing compounds and one or more ether-containing compounds.

7 Claims, 1 Drawing Sheet

| | A | B | C | D | E | F | G | H | I | J | K | L | M | N | O | P | Q | R | S |
|---|---|---|---|---|---|---|---|---|---|---|---|---|---|---|---|---|---|---|---|
| RESIN (Vol. Percent) | 70 | 70 | 70 | 70 | 70 | 70 | 70 | 65 | 65 | 65 | 65 | 65 | 65 | 65 | 65 | 60 | 60 | 60 | 60 |
| MINERAL (Vol. Percent) | 30 | 25 | 20 | 15 | 10 | 5 | 0 | 35 | 30 | 25 | 20 | 15 | 10 | 5 | 0 | 0 | 40 | 35 | 30 |
| SPHERES (Vol. Percent) | 0 | 5 | 10 | 15 | 20 | 25 | 30 | 0 | 5 | 10 | 15 | 20 | 25 | 30 | 35 | 40 | 0 | 5 | 10 |

| | T | U | V | W | X | Y | Z | AA | AB | AC | AD | AE | AF | AG | AH |
|---|---|---|---|---|---|---|---|---|---|---|---|---|---|---|---|
| RESIN (Vol. Percent) | 60 | 60 | 60 | 60 | 60 | 55 | 55 | 55 | 55 | 55 | 55 | 55 | 55 | 55 | 55 |
| MINERAL (Vol. Percent) | 25 | 20 | 15 | 10 | 5 | 0 | 45 | 5 | 10 | 15 | 20 | 25 | 30 | 35 | 40 |
| SPHERES (Vol. Percent) | 15 | 20 | 25 | 30 | 35 | 45 | 0 | 40 | 35 | 30 | 25 | 20 | 15 | 10 | 5 |

FILLER COMPOSITION

FIELD OF THE INVENTION

The invention is directed to a formulation used to cast or spray three dimensional composite parts using a resin system and a filler composition.

BACKGROUND OF THE INVENTION

In polymer composite manufacturing the use of high loadings of mineral fillers increases the weight of the part beyond the optimum. If the same part could be made with fewer raw materials the part would be both lighter and more cost effective. Many techniques have been used to lower heavily mineral-filled composites weight. One of the most common methods is to use microspheres to replace some of the mineral filler. In a thermoset resin system such as unsaturated polyester there are some limitations to micro sphere filler systems.

Light weight microspheres tend to float on the liquid unsaturated polyester and are difficult to wet out by the resin. In addition, dry light weight filler systems become dusty and difficult to handle as they get lower and lower specific gravities. Moreover, microspheres are usually more expensive than the mineral fillers that they replace.

SUMMARY OF THE INVENTION

Applicant's invention comprises a filler composition, wherein the filler composition comprises one or more ester-containing compounds and one or more ether-containing compounds.

BRIEF DESCRIPTION OF THE DRAWINGS

The invention will be better understood from a reading of the following detailed description taken in conjunction with the drawings in which like reference designators are used to designate like elements, and in which:

FIG. 1 is a table summarizing embodiments A through AH of Applicant's filler composition.

DETAILED DESCRIPTION OF THE PREFERRED EMBODIMENTS

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Applicant's invention comprises a filler composition, which in combination with a resin system provides a casting or sprayable formulation. As a general matter, the resin system cures through an addition polymerization, i.e. a "step-growth" polymerization. In certain embodiments, the resin system comprises one or more substituted alkene monomers, and/or a plurality of oligomers formed from one or more substituted alkene monomers. Such substituted alkene monomers include, without limitation, styrene, substituted styrenes, alkylacrylates, alkylmethacrylates, and the like.

In certain embodiments for casting embodiments, the cast polymer component comprises between about 30 volume percent to about 45 volume percent of Applicant's filler composition. In certain embodiments for sprayable embodiments, the sprayable component comprises between about 45 volume percent to about 90 volume percent of Applicant's filler composition.

In certain embodiments, Applicant's filler composition comprises one or more mineral fillers and/or one or more microsphere fillers. FIG. 1 summarizes the volume percent loadings of resin and filler for Applicant's casting systems A through AH, inclusive. The ratio of resin to total filler, and the ratio of mineral filler to microsphere filler is determined by the part being cast. An optimum casting system is selected based upon, without limitation, part size, weight, length, width, aspect ratio, density, and the like.

Applicant's microspheres comprise hollow spheres. In certain embodiments, Applicant's microspheres are formed from one or more ceramic materials. In certain embodiments, Applicant's microspheres are formed from one or more polymeric materials. In certain embodiments, Applicant's microspheres are formed from one or glasses.

In certain embodiments, Applicant's mineral filler comprises gypsum. In certain embodiments, Applicant's mineral filler comprises calcium carbonate. In certain embodiments, Applicant's mineral filler comprises one or more of the silanated calcium carbonate fillers described in U.S. Pat. No. 4,374,178, which is incorporated by reference herein.

Applicant's filler composition further comprises one or more ester-containing compounds, in combination with one or more ether-containing compounds. In certain embodiments, the one or more ester compounds comprise one or more esters of ricinoleic acid, compound I.

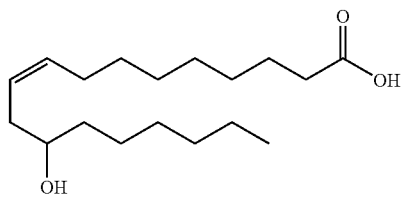

In certain embodiments, the one or more ester compounds comprise one or more esters of oleic acid, compound II.

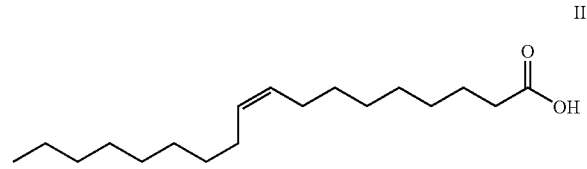 [SMILES: CCCCCCCC/C=C\CCCCCCCC(=O)O]

In certain embodiments, the one or more ester compounds comprise one or more esters of linoleic acid, compound III.

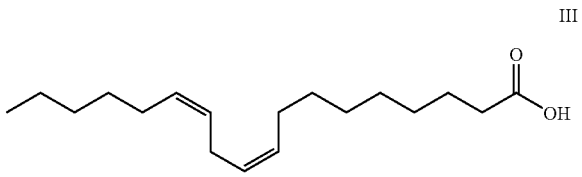 [SMILES: CCCCC/C=C\C/C=C\CCCCCCCC(=O)O]

In certain embodiments, the one or more ester compounds comprise one or more triglycerides, compound IV, wherein R1, R2, and R3, are moieties derived from fatty acids.

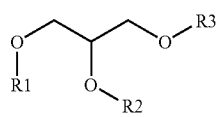

In certain embodiments, one or more ester compounds comprise one or more triglycerides, compound IV, wherein R1, R2, and R3, are moieties selected from the group consisting of ricinoleic acid, oleic acid, linoleic acid, and mixtures thereof. In certain embodiments, the one or more ester compounds comprise castor oil.

In certain embodiments, Applicant's one or more ester-containing compounds comprise Jojoba oil, compound V.

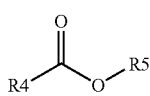

Jojoba oil includes a variety of ester-group-containing compounds V, wherein the R4 component comprises a mixture of carbon-containing moieties having, primarily, 17, 18, 20, and 22 carbon atoms, and wherein the R5 component comprises a mixture of carbon-containing moieties having, primarily, 19, 20, 22, and 24 carbon atoms. Furthermore, it is known that the R4 component of these various jojoba oil ester-group-containing constituents includes at least one carbon-carbon double bond having a cis-configuration. Sometimes such a cis-configuration is known as the Z-configuration. It is further known that the R5 component of these various jojoba oil ester-group-containing constituents includes at least one carbon-carbon double bond having a cis-configuration. Sometimes such a cis-configuration is known as the Z-configuration.

In certain embodiments, Applicant's one or more ester-containing compounds comprise an aggregate room temperature viscosity of about 1000 centistokes or greater. In certain embodiments, Applicant's one or more ester-containing compounds an aggregate dielectric constant at room temperature between about 2 and 5.

In certain embodiments, Applicant's one or more ether-containing compounds comprises a siloxane, such as for example polydimethylsiloxane. In certain embodiments, Applicant's one or more ether-containing compounds comprise a silicone glycol copolymer. In certain embodiments, Applicant's one or more ether-containing compounds comprise Dow Corning 193C Fluid. In certain embodiments, Applicant's one or more ether-containing compounds comprise Dow Corning 5103 Surfactant. In certain embodiments, Applicant's one or more ether-containing compounds further comprises polyethylene oxide, monoallyl ether. In certain embodiments, Applicant's one or more ether-containing compounds further comprises a polyether diol, such as for example and without limitation polyethylene glycol.

In certain embodiments, Applicant's one or more ester-containing compounds are added to Applicant's filler composition at about a 1 weight percent loading based upon the weight of the resin to be used. In certain embodiments, Applicant's one or more ether-containing compounds are added to Applicant's filler composition at between a 0.25 to a 1 weight percent loading based upon the weight of the resin to be used.

In certain embodiments, a mixture comprising Applicant's one or more ester-containing compounds and Applicant's one or more ether-containing compounds is added to Applicant's filler composition. In certain embodiments, the ester/ether mixture is batch mixing with the one or more mineral fillers and/or the one or more microsphere fillers. In certain embodiments, the ester/ether mixture is continuously mixed with the one or more mineral fillers and/or the one or more microsphere fillers.

When preparing the casting or sprayable formulation, the resin system and Applicant's filler composition are mixed to form a reaction mixture. That reaction mixture is then disposed in a heated mold. The reaction mixture cures under heat to form the desired three dimensional object.

During the mixing step, the reaction mixture entrains ambient air to produce a high viscosity, liquid foam. Applicant has discovered that the one or more ester-containing compounds facilitate foam formation. Applicant has further discovered that the one or more ether-containing compounds stabilize the foam.

As those skilled in the art will appreciate, a foam comprises a cellular material, i.e. cells and struts. Applicant has found that as the amount of the one or more ether-containing compounds is increased, the average size of the cells decreases. Therefore, using a resin loading and filler loading, increasing the amount of ether-containing compounds results in forming an increased number of cells, wherein each cell comprises a smaller size.

Parts formed using Applicant's foamed reaction mixture comprise a lower overall density than do parts formed using the same resin system and filler composition but without Applicant's one or more ester-containing compounds and Applicant's one or more ether-containing compounds.

Using any one of Applicant's cast systems A through AH in combination with Applicant's foam forming/foam stabilizing composition produces a cast part comprising, on the average, about a ten percent (10%) reduction in bulk density. Moreover, use of Applicant's one or more ester-containing compounds in combination with Applicant's one or more ether-containing compounds, i.e. Applicant's foam forming/foam stabilizing composition, allows the removal of some or all microspheres from a casting formulation, wherein that casting formulation produces a part having the same weight, the same density, and the same mechanical properties, as a more expensive, microsphere-containing part.

While the preferred embodiments of the present invention have been illustrated in detail, it should be apparent that modifications and adaptations to those embodiments may occur to one skilled in the art without departing from the scope of the present invention as set forth in the following claims.

I claim:

1. A casting formulation comprising a filler composition and a resin system, said filler composition comprising: a plurality of particles;

castor oil, wherein said castor oil is present at about 1 weight percent based upon the weight of said resin system;

a silicone glycol copolymer, wherein said silicone glycol copolymer is present at between 0.25 weight percent to 1 weight percent based upon the weight of said resin system;

and said resin system comprising between 55 to 70 volume percent of the casting formulation;

said filler composition comprising between 30 volume percent to 45 volume percent of said casting formulation; and wherein said resin system and filler composition are mixed to form a reaction mixture, with the reaction mixture entraining ambient air to produce a high viscosity, liquid foam;

the presence of the castor oil resulting in generation of said foam;

the presence of the silicone glycol copolymer stabilizing said foam.

2. The casting formulation of claim 1, wherein:

said castor oil in combination with said silicone glycol copolymer comprise a liquid mixture;

said liquid mixture is dispersed throughout said plurality of particles.

3. The casting formulation of claim 1, wherein said plurality of particles of the filler composition comprise calcium carbonate.

4. The casting formulation of claim 1, wherein said plurality of particles of the filler composition comprise gypsum.

5. The casting formulation of claim 1, wherein said plurality of particles of the filler composition comprise a plurality of microspheres.

6. The casting formulation of claim 5, wherein said plurality of microspheres is formed from one or more polymeric materials.

7. The casting formulation of claim 5, wherein said plurality of microspheres is formed from glass.

* * * * *